United States Patent
McLafferty

(10) Patent No.: US 11,508,345 B1
(45) Date of Patent: Nov. 22, 2022

(54) SYSTEMS AND METHODS FOR FACILITATING TRANSACTIONS OF MUSICAL STEMS BETWEEN USERS OF AN ONLINE GAMING PLATFORM AND MIXING OF THE MUSICAL STEMS

(71) Applicant: Mythical, Inc., Sherman Oaks, CA (US)

(72) Inventor: Michael Edward McLafferty, Staffordshire (GB)

(73) Assignee: Mythical, Inc., Sherman Oaks, CA (US)

( * ) Notice: Subject to any disclaimer, the term of this patent is extended or adjusted under 35 U.S.C. 154(b) by 487 days.

(21) Appl. No.: 16/813,401

(22) Filed: Mar. 9, 2020

(51) Int. Cl.
| | | |
|---|---|---|
| G10H 1/00 | (2006.01) | |
| A63F 13/63 | (2014.01) | |
| A63F 13/85 | (2014.01) | |
| A63F 13/79 | (2014.01) | |
| H04L 9/06 | (2006.01) | |
| H04L 9/00 | (2022.01) | |

(52) U.S. Cl.
CPC .......... *G10H 1/0025* (2013.01); *A63F 13/63* (2014.09); *A63F 13/79* (2014.09); *A63F 13/85* (2014.09); *H04L 9/0643* (2013.01); *A63F 2300/5546* (2013.01); *A63F 2300/575* (2013.01); *A63F 2300/6018* (2013.01); *G10H 2210/391* (2013.01); *H04L 9/50* (2022.05)

(58) Field of Classification Search
CPC .......... G10H 1/0025; G10H 2210/391; A63F 13/63; A63F 13/79; A63F 13/85; A63F 2300/5546; A63F 2300/575; A63F 2300/6018; H04L 9/0643; H04L 9/50
See application file for complete search history.

(56) References Cited

U.S. PATENT DOCUMENTS

| | | | |
|---|---|---|---|
| 10,236,006 B1* | 3/2019 | Gurijala | G10L 19/02 |
| 11,262,976 B2* | 3/2022 | Denton | H04R 27/00 |
| 2010/0199833 A1* | 8/2010 | McNaboe | G10H 1/0025 84/625 |
| 2010/0299151 A1* | 11/2010 | Soroka | G10L 19/008 381/1 |
| 2013/0294606 A1* | 11/2013 | Soroka | G11B 27/3027 381/23 |
| 2014/0270181 A1* | 9/2014 | Siciliano | H04H 60/04 381/17 |

(Continued)

OTHER PUBLICATIONS

Michael Koczwara, "'Fuser' Makes You Feel Like a DJ—Even If You Don't Know Who Billie Eilish Is"; Holywood Reporter; https://www.hollywoodreporter.com/news/harmonixs-fuser-is-intro-rhythm-games-not -musically-inclined-1281895 [retrieved from the internet on Mar. 9, 2020]; Feb. 29, 2020 (4 pages).

*Primary Examiner* — Jeffrey Donels
(74) *Attorney, Agent, or Firm* — Esplin & Associates, PC

(57) ABSTRACT

Systems and methods for facilitating transactions of musical stems between users of an online gaming platform and mixing of the musical stems are disclosed. Exemplary implementations may: store information regarding tracks; transmit a purchase request regarding a given stem; receive a notification of the assignment of the right to use the given stem, wherein the assignment is recorded on a blockchain; obtain the given stem, generate an arrangement based on one or more stored tracks and the given stem, and playing back the generated arrangement.

20 Claims, 4 Drawing Sheets

(56) References Cited

U.S. PATENT DOCUMENTS

2019/0258448 A1* 8/2019 Mollis ................ G06F 16/4393
2019/0318060 A1* 10/2019 Brenner ............. H04N 21/8358
2020/0143469 A1* 5/2020 Stewart ................ H04L 9/0643

* cited by examiner

SYSTEMS AND METHODS FOR FACILITATING TRANSACTIONS OF MUSICAL STEMS BETWEEN USERS OF AN ONLINE GAMING PLATFORM AND MIXING OF THE MUSICAL STEMS

FIELD OF THE DISCLOSURE

The present disclosure relates to systems and methods for facilitating transactions of musical stems between users of an online gaming platform, and, in particular, of mixing different musical stems together to create new arrangements.

BACKGROUND

Players of online gaming platforms buying virtual items that can be used in an online game is known. Mixing parts of different songs together is known, and in some contexts it may be a profession.

SUMMARY

One aspect of the present disclosure relates to a system configured for facilitating transactions of musical stems between users of an online gaming platform and mixing of the musical stems. The users may include a first user, a second user, and so forth. The system may include electronic storage configured to electronically store information. The information may include one or more tracks including a first track. In some implementations, the information may include a set of tracks. The first track may include a first arrangement of a set of musical elements. The first track can be played back to generate an audible sound that represents the first arrangement. The first track may have a first progress length spanning a first number of beats. The first track may include four stems. Individual ones of the four stems may have the first progress length. Individual ones of the four stems may include a subset of the set of musical elements such that a simultaneous combination of all of the individual ones of the four subsets equals the set of musical elements. At least one of the four stems may include one or more pitched musical elements in a first key when played back at a first tempo. The system may include one or more hardware processors configured by machine-readable instructions to transmit a purchase request that indicates the first user offers to purchase a right to use a given stem. The given stem may include a given arrangement of one or more given musical elements in a given key when played back at a given tempo. The system may be configured to receive a notification of assignment of the right to use the given stem to the first user. The assignment may be part of a transaction that has been recorded on a decentralized database that stores a registry of assets and transactions. The decentralized database may represent a blockchain. The system may be configured to obtain the given stem. The system may be configured to generate a second arrangement of musical elements. The second arrangement may include the given stem and the at least one of the four stems included in the first track. Generation of the second arrangement may include (i) modifying the given stem into a modified stem such that the given arrangement has a modified key when played back at the first tempo, wherein the modified key is within 10 cents of the first key; and (ii) combining the at least one of the four stems included in the first track and the modified stem such that the second arrangement has the first progress length. The system may be configured to playback the second arrangement of musical elements to generate a second audible sound that represents the second arrangement.

Another aspect of the present disclosure relates to a method for facilitating transactions of musical stems between users of an online gaming platform and mixing of the musical stems. The users may include a first user, a second user, and so forth. The method may include electronically storing information. The information may include one or more tracks including a first track. The first track may include a first arrangement of a set of musical elements. The first track can be played back to generate an audible sound that represents the first arrangement. The first track may have a first progress length spanning a first number of beats. The first track may include four stems. Individual ones of the four stems may have the first progress length. Individual ones of the four stems may include a subset of the set of musical elements such that a simultaneous combination of all of the individual ones of the four subsets equals the set of musical elements. At least one of the four stems may include one or more pitched musical elements in a first key when played back at a first tempo. The method may include transmitting a purchase request that indicates the first user offers to purchase a right to use a given stem. The given stem may include a given arrangement of one or more given musical elements in a given key when played back at a given tempo. The method may include receiving a notification of assignment of the right to use the given stem to the first user. The assignment may be part of a transaction that has been recorded on a decentralized database that stores a registry of assets and transactions. The decentralized database may represent a blockchain. The method may include obtaining the given stem. The method may include generating a second arrangement of musical elements. The second arrangement may include the given stem and the at least one of the four stems included in the first track. Generation of the second arrangement may include (i) modifying the given stem into a modified stem such that the given arrangement has a modified key when played back at the first tempo, wherein the modified key is within 10 cents of the first key; and (ii) combining the at least one of the four stems included in the first track and the modified stem such that the second arrangement has the first progress length. The method may include playing back the second arrangement of musical elements to generate a second audible sound that represents the second arrangement.

As used herein, any association (or relation, or reflection, or indication, or correspondency) involving servers, processors, client computing platforms, users, accounts, inventories, stems, tracks, arrangements, musical elements, sounds, progress lengths, keys, tempos, beats, bars, virtual items, requests, offers, purchases, verifications, determinations, identifications, publications, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
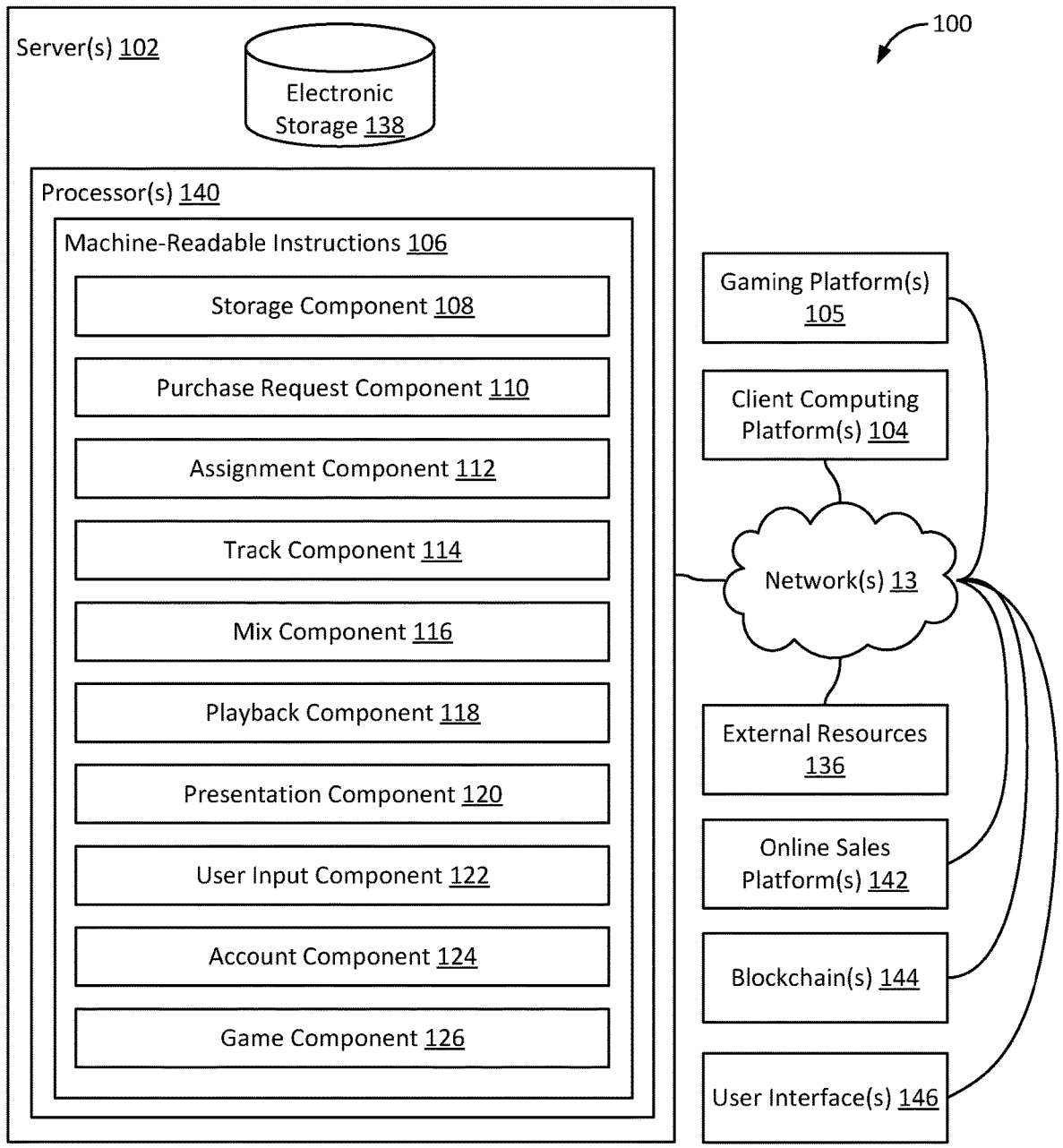
FIG. 1 illustrates a system configured for facilitating transactions of musical stems between users of an online gaming platform and mixing of the musical stems, in accordance with one or more implementations.

FIG. 1 illustrates a system 100 configured for facilitating transactions of musical stems between users of an online gaming platform and mixing of the musical stems, in accordance with one or more implementations. An online game may be provided and/or hosted by one or more online gaming platforms 105 (simply referred to as gaming platform(s) 105). As used herein, gaming platform 105 may refer to either an individual game, a type of gaming console and its ecosystem, and/or any combination of these. Within gaming platforms 105 (e.g., within the online game), users may play tracks (e.g., songs, musical arrangements and/or other sounds) for themselves and/or other users. For example, a user may host a virtual party that other users can participate in, and at which music is played that attendees can listen to.

In some implementations, system 100 may include one or more servers 102, one or more processors 140, electronic storage 138, one or more client computing platforms 104, one or more gaming platforms 105, one or more online sales platforms 142, one or more blockchains 144, one or more user interfaces 146, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. The users may include a first user, a second user, a third user, and so forth.

Server(s) 102 may be configured by machine-readable instructions 106. Machine-readable instructions 106 may include one or more instruction components. The instruction components may include computer program components. The instruction components may include one or more of storage component 108, purchase request component 110, assignment component 112, track component 114, mix component 116, playback component 118, presentation component 120, user input component 122, account component 124, game component 126, and/or other instruction components.

Storage component 108 may be configured to electronically store information in electronic storage 138. The stored information may include a set of tracks that can be played back to generate audible sound. The tracks may include a first track, a second track, a third track, a fourth track, and so forth. A track may include an arrangement of a set of musical elements. Upon playback, the generated sound represents the arrangement. The first track may have a progress length spanning a first number of beats. In some implementations, individual tracks may include four stems, each having the same progress length as the track. The first track may include pitched musical elements in a first key when played back in a first tempo, the second track may include pitched musical elements in a second key when played back in a second tempo, and so forth. If the same track is played back faster (so the tempo increases), the key will increase too (unless the track is otherwise modified).

A stem may include a (subset of the) set of musical elements that are included in the arrangement of a track. For example, a first stem may be referred to as the drum stem, and may include the rhythmic content of a track, such as drum loops, percussion, non-pitched sound effects, and/or other musical elements. A second stem may be referred to as the bass stem, and may include the bassline of a track, such as bass guitar, cello, and/or other low-pitched musical elements. A third stem may be referred to as the harmony stem, and may include the musical elements that form the harmony of a track, such as keys, rhythm guitars, brass sections, choirs, pads, synths, and/or other musical elements that form pitched content that is mid-range to high-range. A fourth stem may be referred to as the melody stem, and may include the musical elements that form the melody or topline of a track, such as lead guitars, vocals, lead synths, brass hooks, synth hooks, and/or other musical elements. These four stems may have a hierarchy, from melody to harmony to bass to drums, that indicates least to most preferred for modification of key and/or tempo. In other words, a melody stem is least preferred to be modified, and will instead often be used as the master key/tempo for the other stems in a generated arrangement. In some implementations, a simultaneous combination of all the individual ones of the four subsets of a given track may equal the full set of musical elements of the given track. In other words, any musical element of a track is part of at least one stem. In some implementations, each musical element of a track is part of exactly one stem. Different stems from different tracks may be mixed and/or otherwise blended together (with the expectation that the result will probably sound in tune, harmonious, and/or in musical consonance) provided that the different musical elements as blended have the same tempo and the same key (or at least are in keys so close that it sounds like the same key). By placing certain limitations and/or restrictions on tracks and stems, stems may be modified such that mixing and/or blending may be likely to produce harmonious results.

In some implementations, the limitations and/or restrictions may include one or more of the following: (i) individual tracks must include exactly four stems (and these must be a drum stem, a bass stem, a harmony stem, and a melody stem), (ii) all stems of an individual track must have the same progress length, (iii), individual tracks must use a constant tempo and key, (iv) individual tracks must use a constant and common time signature of $^4_4$, (v) individual tracks must have a ratio of its key in Hertz divided by its tempo in BPM that is within 0.1% of 4.36, (vi) individual tracks must have a progress length of 72 bars (i.e. 288 beats), (vii) individual tracks must use an equal tempered scale in which $A_4$ is 440 Hertz, (viii) individual tracks must use an equal tempered scale based on a speed of sound of 345 m/s or equivalent, and/or other limitations and/or restrictions. In some implementations, fewer limitations may be used, or limitations may be further modified.

By placing certain limitations and/or restrictions on the mixing and/or blending process, the resulting arrangements may be likely to be harmonious. In some implementations, these limitations and/or restrictions may include one or more of the following: (i) individual resulting arrangements must include exactly four stems (and these must be a drum stem, a bass stem, a harmony stem, and a melody stem), (ii) individual resulting arrangements must not include multiple stems of the same type (such as two bass stems), (iii) individual resulting arrangements must use the key and tempo of the melody stem that was selected from a set of available melody stems (or of the harmony stem if no melody stem is used), and/or other limitations and/or restrictions. In some implementations, fewer limitations may be used, or limitations may be further modified.

Figure 4A:
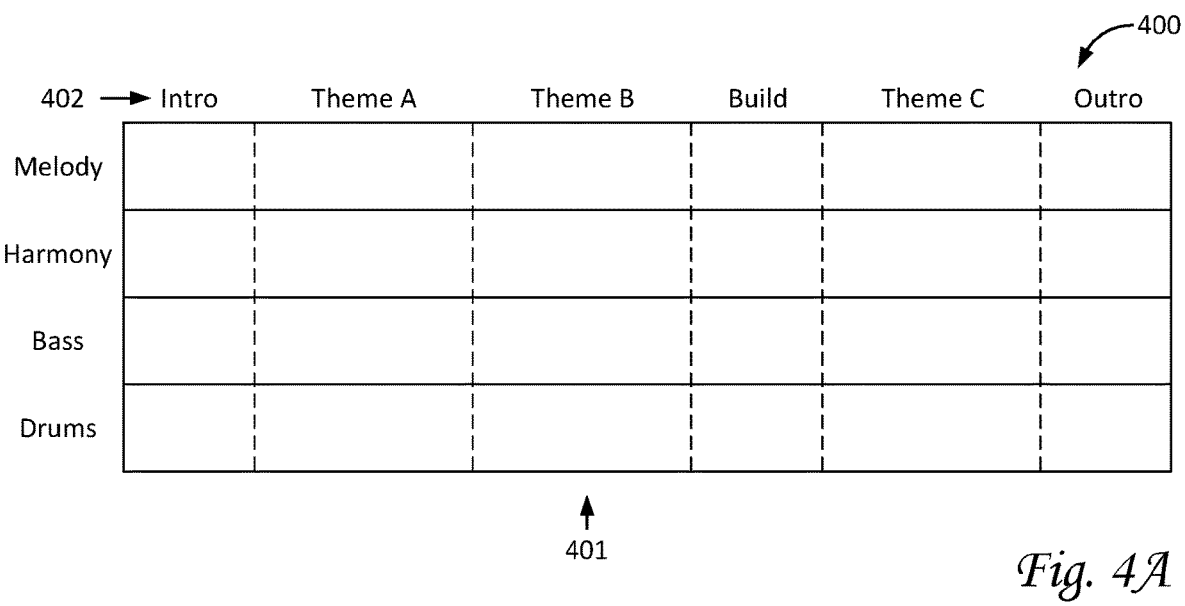
FIG. 4A illustrates a sequence of a track as may be used in a system that facilitates transactions of musical stems between users of an online gaming platform and mixing of the musical stems, in accordance with one or more implementations.

In some implementations, a track and/or stem may be divided into a sequence of portions such that each portion has a shorter progress length than the entire track and/or stem, and such that the sum of the progress lengths of all of the portions equals the full progress length of the entire track and/or stem. In some implementations, individual portions may have a previously agreed-upon number of bars, such as 8 bars, 16 bars, 24 bars, 32 bars, and/or another number of bars. In some implementations, the full progress length of an entire track and/or stem may have a previously agreed-upon number of bars, such as 64 bars, 72 bars, 80 bars, 88 bars, 92 bars, 100 bars, and/or another number of bars. Each bar may include four beats in the $^4_4$ time signature (a.k.a. common time signature). In some implementations, individual portions may be assigned specific names and/or indicators, such as, by way of non-limiting example, Intro, Verse, Chorus, Bridge, Build, Outro, Theme A, Theme B, Theme C, and/or other names and/or indicators. In some implementations, individual tracks may include a specific sequence of assigned portions. For example, a first specific sequence may include an Intro, Theme A, Theme B, Theme C, Theme A, outro. For example, a second specific sequence may include Intro, Verse, Chorus, Verse, Chorus, Bridge, Verse, Chorus, Outro. For example, a third specific sequence may include Intro, Verse, Chorus, Bridge, Chorus, Outro. Numerous specific sequences may be used in a library of tracks and/or stems. If different tracks use the same sequence (or at least a similar sequence of portions having the same numbers of bars and thus beats) then mixing and/or blending of these different tracks may be likely to produce harmonious results. By way of non-limiting example, FIG. 4A illustrates a sequence 400 of a track 401 as may be used in system 100. As depicted, track 401 includes four stems (melody stem, harmony stem, bass stem, and drum stem, labeled on the left). Track 401 uses the following sequence of portions, from left to right: Intro, Theme A, Theme B, Build, Theme C, Outro. As shown by the individual widths of the portions, Intro, Build, and Outro may include fewer bars than Theme A, Theme B, and Theme C.

Referring to FIG. 1, purchase request component 110 may be configured to transmit requests, including but not limited to purchase requests. In some implementations, purchase requests may be transmitted from client computing platform 104 to one or more of server 102, gaming platform 105, online sales platform 142, and/or blockchain 144. In some implementations, purchase requests may be transmitted from server 102 to one or more of gaming platform 105, online sales platform 142, and/or blockchain 144. In some implementations, purchase requests may be transmitted from gaming platform 105 to online sales platform 142 and/or blockchain 144. By way of non-limiting example, a particular purchase request may be transmitted from a particular client computing platform via a software application to a particular server, which in turn transmits specific instructions (that are based on the particular purchase request) to a particular blockchain. In some implementations, a purchase request may indicate that a particular user wishes and/or offers to purchase a right to use a given track or stem. For example, a given track may include between one and four stems. For example, a given stem may include a given arrangement of one or more musical elements in a given key when played back in a given tempo, having a given progress length. In some implementations, the right to use may not be exclusive. In some implementations, a purchase request may indicate that a particular user wishes and/or offers to purchase a given track or stem. In some implementations, subsequent to completion of a purchase, either the track and/or stem itself may be added to the user inventory of the purchaser. In some implementations, subsequent to completion of a purchase of a right, a license key and/or other purchaser-specific information that indicates the track and/or stem may be added to the user inventory of the purchaser.

In some implementations, purchase request component 110 may be configured to effectuate payments between different accounts, different users, and/or different entities within system 100. For example, purchase request component 110 may receive payments related to purchase requests from (prospective) buyers. For example, purchase request component 110 may transfer received payments (in part or in their entirety) to sellers (e.g., other users, online sales platform 142, and/or other entities within system 100). In some implementations, portions of payments may be shared with other stakeholders, including but not limited to a creator or musician who created a particular track and/or stem.

Assignment component 112 may be configured to receive notifications and/or effectuate assignments. In some implementations, receipt of a notification may indicate the right to use a given track or stem has been assigned to a particular user. In some implementations, an assignment may be part of a transaction that has been (or will be) recorded on a decentralized database that stores a registry of assets and transactions, such as, by way of non-limiting example, blockchain 144. In some implementations, subsequent to receipt of a particular notification, the particular user may use the given track and/or stem. Usage may include one or more of playback, mixing, blending, modifying (e.g., pitch-shifting), and/or other types of usage. In some implementations, the right to use may exclude to right to re-sell to other users.

In some implementations, a decentralized database (e.g., blockchain 144 or another structure of blocks) may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts. In some implementations, the distributed computing platform may include electronic storage configured to store part or all of blockchain 144. The smart contracts may be stored on blockchain 144. In some implementations, the distributed computing platform may be Ethereum. In some implementations, the distributed computing platform may be the EOSIO platform. In some implementations, the virtual machine may be a Turing-complete and decentralized virtual machine.

Blockchain 144 may act as a decentralized database that stores a registry of assets and transactions across one or more networks 13. A given asset may be owned by a particular user. An asset may include anything of material value or usefulness that is owned by or on behalf of a person or company, according to some implementations. A right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights. Tracks and/or stems may be assets. The ownership of rights pertaining to tracks and/or stems may change through transactions on blockchain 144.

In some implementations, blockchain 144 may record ownership of assets. Alternatively, and/or simultaneously, blockchain 144 may record transactions that modify ownership of assets. A smart contract may be a type of asset. In some implementations, once a smart contract has been added to blockchain 144, the smart contract may be referred to as published, recorded, and/or posted. Elements of blockchain 144 may be grouped together in units that are referred to as blocks. For example, an individual block may include one or more assets and one or more transactions.

Blockchain 144 may be publicly accessible and append-only. In some implementations, existing blocks of a distributed ledger can substantially not be altered or deleted, unless multiple copies of the blockchain are altered. This is unlikely to happen provided that multiple copies of the blockchain are stored on different computing platforms, e.g., in different geographical locations. The blockchain may be replicated (in part or in its entirety) on multiple computing platforms, preferably in multiple different geographical locations.

In some implementations, ownership of virtual items (including tracks and/or stems) may be established by and/or based on assignment of the ownership to particular user accounts and/or inventories. In some implementations, ownership of virtual items may be recorded in blockchain 144 and/or other mechanism that includes electronic storage. For example, assignments of the ownership of a particular virtual item may be recorded on blockchain 144 that stores a registry of assets and transactions. In some implementations, the assets of blockchain 144 may include particular tracks and/or stems. In some implementations, ownership of a track may be assigned, prior to a sale, to a first user account. This may be referred to as the first user owning the first track. Responsive to a sale to the second user (or another event that triggers a transaction), ownership of the track may be assigned to a second user account, so that the second user owns the first track. In some implementations, multiple users may own the right to use a track and/or stem. In some implementations, tracks and/or stems may be stored externally, e.g., on external resources 136.

Track component 114 may be configured to obtain and/or otherwise effectuate the receipt of tracks and/or stems. In some implementations, tracks and/or stems may be received from one or more of server 102, gaming platform 105, online sales platform 142, blockchain 144, and/or external resource 136 (e.g., external electronic storage). For example, in some implementations, track component 114 may be configured to download a given stem from an external repository such as external electronic storage. In some implementations, operations by track component 114 may be performed subsequent to the completion of a purchase, such as the purchase of a given track and/or stem. In some implementations, operations by track component 114 may be performed subsequent to the completion of a particular event, such as achieving a task or goal within online gaming platform 105. For example, a user may earn or otherwise be awarded with a given track and/or stem.

Mix component 116 may be configured to generate arrangements of musical elements. In some implementations, mix component 116 may be configured to generate a set of arrangements by combining stems from a local library of tracks with stems from purchased tracks, e.g., without requiring user input. In some implementations, an individual generated arrangement may include between two and four stems. In some implementations, generation of arrangements may include modifying stems (e.g., pitch-shifting to have a particular key and/or tempo), combining multiple stems, synchronizing elements (portions, bars, beats, etc.) of different stems, enforcing certain limitations and/or restrictions, dynamically controlling audio characteristics throughout the generated arrangement (volume, panning, balancing, fading, compression, filtering, equalization, applying effects, reverb, delay, adjusting frequency response, etc.), and/or other types of audio processing. In some implementations, operations by mix component 116 may be fully automated, e.g., requiring no user input to automatically generate a set of arrangements, such that the generation of an individual arrangement includes automatically selecting a melody stem, automatically selecting up to three additional stems, automatically modifying the additional stems as needed to match the master key of the melody stem, and automatically combining the melody stem with the additional stems. In some implementations, operations by mix component 116 may be, partially or fully, under user control, for example through user interface 146. For example, mix component 116 may generate a particular arrangement that includes a first stem and a second stem. Based on built-in rules (or on user input), the first key and the first tempo of the first stem may be used as the master key/tempo. Mix component 116 may modify the second stem (e.g., by pitch-shifting) such that the second key and tempo match the first key and tempo. In some implementations, the modified second key may be within 10 cents of the first key. As used herein, each semitone is divided into 100 cents. In some implementations, the modified second key may be within 5 cents of the first key, which is typically close enough to sound in tune, harmonious, and/or in musical consonance. Subsequent to modification of the second stem (and/or other types of audio processing), mix component 116 may combine the first stem and the modified second stem into a newly generated arrangement (here, the particular arrangement).

Figure 3:
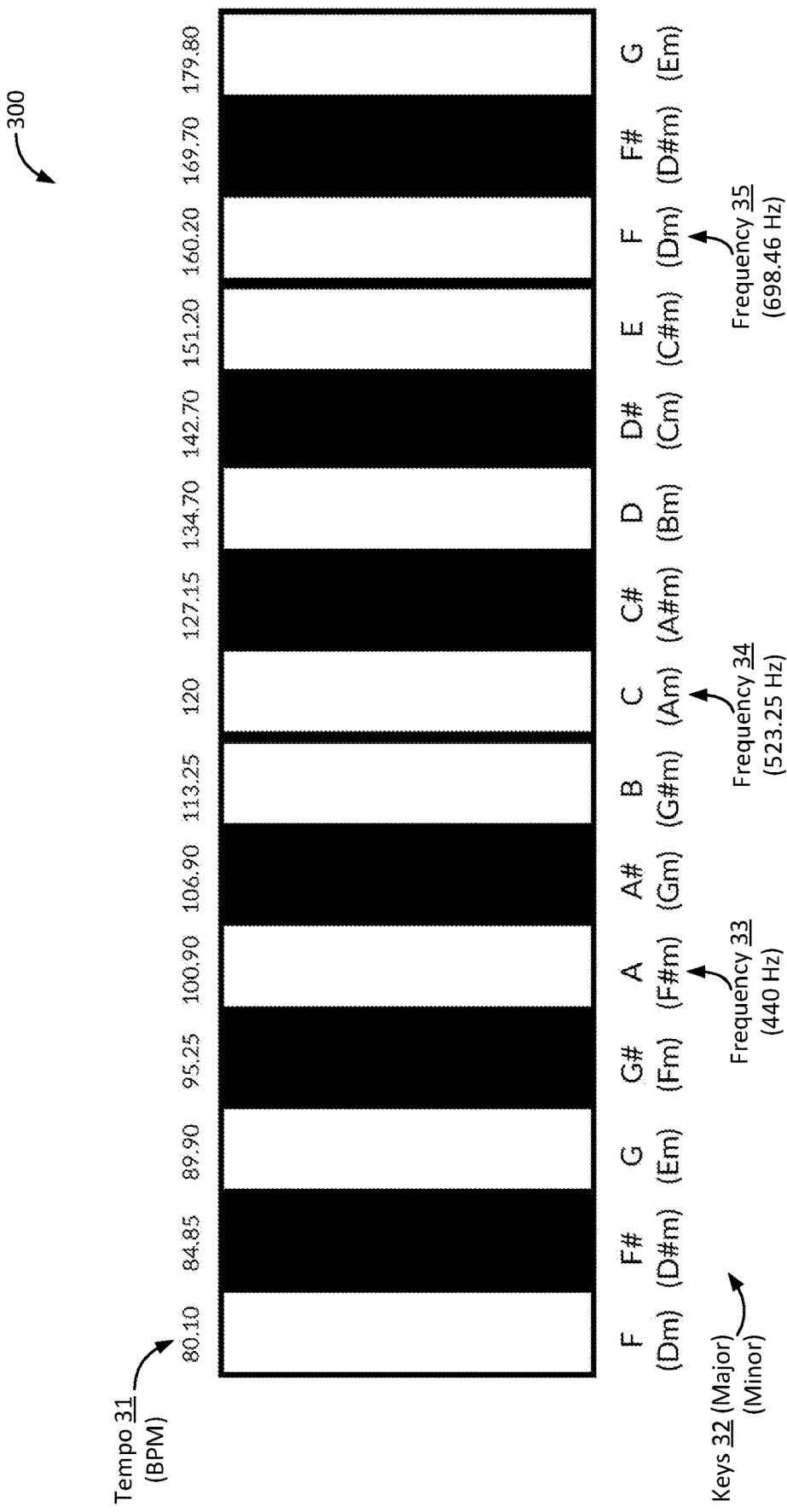
FIG. 3 illustrates an annotated piano chart as may be used by a system that facilitates transactions of musical stems between users of an online gaming platform and mixing of the musical stems, in accordance with one or more implementations.

Mix component 116 may be able to generate arrangements that are in tune, harmonious, and/or in musical consonance by virtue of certain limitations and/or restrictions on tracks and/or stems. In particular, individual (pitched) tracks and/or stems may need to have a particular combination of key and tempo. By way of non-limiting example, FIG. 3 illustrates an annotated piano chart 300 as may be used by system 100. Annotated piano chart 300 illustrates a set of Major keys (keys 32 noted at the bottom of the chart) ranging from F (on the left) through C (in the center) to G (on the right). This set may be extended in either direction. As is known from musical theory, each Major key corresponds exactly (i.e., has the same notes in the scale) to a (Natural) Minor Key (noted here below the Major Key). For example, Major F corresponds to D Minor (labeled "Dm"), Major C corresponds to A minor (labeled "Am"), Major G corresponds to E Minor (labeled "Em"), and so forth. Each key is combined with a particular tempo (tempo 31 in beats per minute or BPM). For example, Major F on the left corresponds to 80.10 BPM, Major C corresponds to 120 BPM, Major G on the right corresponds to 179.80 BPM, and so forth. Additionally, annotated piano chart 300 illustrates these keys are equal tempered, where a frequency 33 depicts that $A_4$ is 440 Hertz, $C_4$ is 523.25 Hertz, $F_4$ is 698.46 Hertz, and so forth. Individual combinations of key and tempo have the same ratio as determined by dividing the frequency of the key (in Hertz) by the tempo in BPM. In some implementations, the individual tempos are selected such that this ratio equals 4.36, or falls within 0.1% of 4.36, or falls within 0.01% of 523.25 Hz/120 BPM, or is as close as possible to 523.25 Hz/120 BPM while being limited to 0.01 Hz increments. In some implementations, the equal tempered scale may be based on a speed of sound (in air) of 345 m/s or equivalent, even though the speed of sound varies based on temperature, pressure, humidity, and frequency. By virtue of the restrictions depicted in FIG. 3, stems in different keys may be blended harmoniously.

Referring to FIG. 1, in some implementations, mix component 116 may be configured to select and/or determine a particular sequence of portions for a to-be-generated arrangement, and subsequently modify up to four stems to fit this particular sequence prior to being combined, such that all the stems match a particular master key/tempo, as well as the selected and/or determined sequence of portions.

In some implementations, mix component 116 may be configured to determine and/or select a master key/tempo that is different from any of the two to four stems that are being used to generate a new arrangement. For example, responsive to a determination that the difference and/or distance (between the various frequencies) exceeds a particular predetermined maximum pitch-shifting threshold (say, 5 or more semitones, or a shift of 500 cents), mix component 116 may select a master key/tempo such that none of the (pitched) stems need to pitch-shift more than 5 semitones. In some implementations, such an approach may be used between a melody and harmony stem, and may be performed such that the melody stem has a smaller pitch-shift than the harmony stem.

Figure 4B:
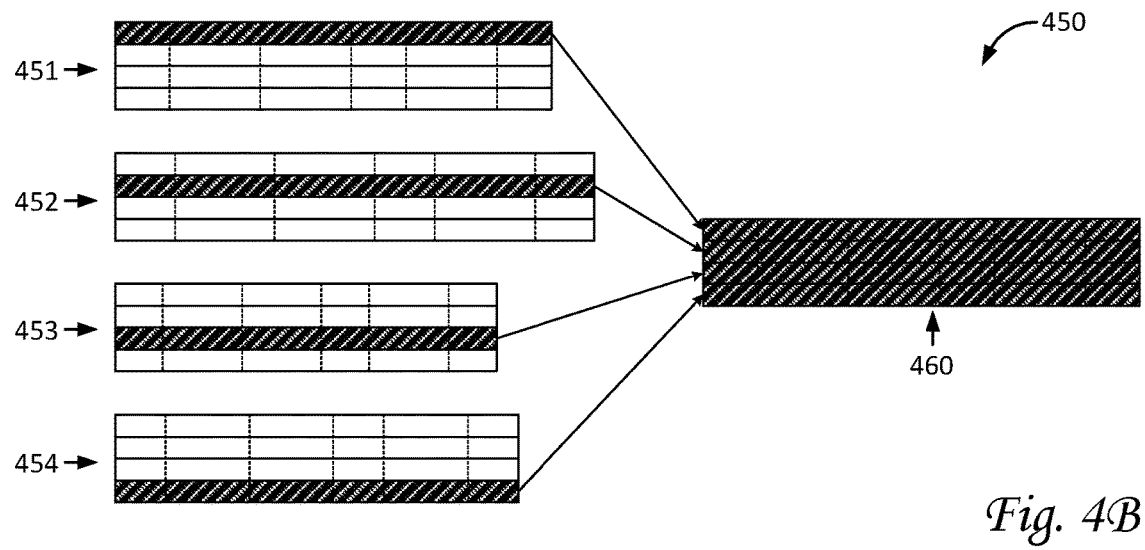
FIG. 4B illustrates generation of an arrangement based on four tracks as may be performed by a system that facilitates transactions of musical stems between users of an online gaming platform and mixing of the musical stems, in accordance with one or more implementations.

By way of non-limiting example, FIG. 4B illustrates a generation 450 of an arrangement 460 based on four tracks as may be performed by system 100. As depicted, the four tracks include a track 451, a track 452, a track 453, and a track 454, each of which include four stems depicted in the same order as in FIG. 4A (top to bottom: melody stem, harmony stem, bass stem, and drum stem). Generated arrangement 460 includes the melody stem from track 451, the harmony stem from track 452, the bass stem from track 453, and the drum stem from track 454. The harmony, bass, and drum stems may have been modified (including but not limited to pitch-shifting) to match the key and tempo of the melody stem.

Referring to FIG. 1, playback component 118 may be configured to play back tracks and/or arrangements of musical elements to generate audible sound. In some implementations, playback component 118 may play tracks from a library or repository of tracks. In some implementations, playback component 118 may mix new tracks on-the-fly from a library or repository of tracks and/or stems. In some implementations, playback component 118 may play a newly generated arrangement though the speaker of a client computing platform. In some implementations, a library and/or repository may be user-specific and/or otherwise associated with a particular client computing platform 104. For example, a first user may have access to a local library of tracks and stems (some of which may have been purchased as described above in relation to the operation of purchase request component 110 and other components of system 100). Playback component 118 may be configured to automatically playback a set of newly generated arrangements to the first user without requiring user input from the first user. In some implementations, a library and/or repository may be (partially) public and/or otherwise available to multiple users.

Presentation component 120 may be configured to generate and/or present user interfaces to users. In some implementations, presentation component 120 may be configured to effectuate the generation and/or presentation of user interfaces to users. For example, presentation component 120 may present a first user interface on a first client computing platform associated with a first user.

User input component 122 may be configured to receive user input from users, for example through client computing platforms 104. In some implementations, user input component may receive user input from a first user, a second user, and/or other users. For example, a user may, through user input, enter, select, and/or confirm which tracks and/or stems are to be used for a newly generated arrangement. For example, a user may, through user input, enter, select, and/or confirm the particular stem to be used as including the master key/tempo for a newly generated arrangement. In some implementations, user input component 122 may be implemented through user interface(s) 146.

Account component 124 may be configured to manage user accounts for users, including but not limited to the users of online gaming platform 105. In some implementations, account component 124 may be configured to manage user inventories for users, including but not limited to the users in an online game. Individual ones of the user accounts may be associated with individual ones of the users. For example, a first user account may be associated with a first user, a second user account may be associated with a second user, and so forth. The individual ones of the user accounts may include individual user inventories of virtual items (including tracks and/or stems) that are usable by the individual ones of the users. For example, the first user account may include a first user inventory, the second user account may include a second user inventory, and so forth. The virtual items included in an inventory may include virtual objects, characters, avatars, skills, abilities, virtual currency, virtual content of the online game, usage rights for tracks and/or stems, access rights within the online game, rights to (future) benefits within the online game, and/or other valuables within the online game.

In some implementations, account component 124 may be configured to manage user accounts in one or more online sales platforms 142. In some implementations, account component 124 may be configured to facilitate a link or connection between user accounts of users within online gaming platform 105 and user accounts in one or more online sales platforms 142.

Game component 126 may be configured to execute an instance of an online game within gaming platform 105. Game component 126 may be configured to implement the instance of an online game by receiving and executing commands (e.g., from players, through client computing platforms 104). At least part of the online game may take place in a virtual space that includes a simulated topography. The commands may be received from players through client computing platforms 104 associated with the players. Execution of the commands may facilitate interactions between the players. The execution of the commands may further facilitate locomotion of user-controlled objects within the simulated topography of the virtual space. The user-controlled objects may include one or more characters. Implementing the instance of the online game may include determining view information for presentation of the online game to the players on client computing platforms 104.

Game component 126 may be configured to present view information of the online game to players. For example, the presented view information may include visual representations of one or more characters. In some implementations, the presented view information may include the particular visual representation of particular characters within the simulated topography of the virtual space.

User interfaces 146 may be configured to facilitate interaction between users and system 100 and/or between users and client computing platforms 104. For example, user interfaces 146 may provide an interface through which users may provide information to and/or receive information from system 100. In some implementations, user interface 146 may include one or more of a display screen, touchscreen, monitor, a keyboard, buttons, switches, knobs, levers, mouse, microphones, speakers, sensors to capture voice commands, sensors to capture body movement, sensors to capture hand and/or finger gestures, and/or other user interface devices configured to receive and/or convey user input. In some implementations, one or more user interfaces 146 may be included in one or more client computing platforms 104. In some implementations, one or more user interfaces 146 may be included in system 100.

Online sales platforms 142 may allow users to make purchases, including purchases of virtual items and/or objects that may be usable within online gaming platform 142. For example, in some implementations, one or more online sales platforms 142 may allow users to purchase tracks and/or stems. In some implementations, online sales platforms 142 may include a first online sales platform 142 that allows users to make purchases using a fiat currency, a second online sales platform 142 that allows users to make purchases using a cryptocurrency, and/or other online sales platforms 142. Examples of a fiat currency may include U.S. dollars, euros, Japanese yen, and/or other currencies. Examples of a cryptocurrency may include Bitcoin, Litecoin, Ether, Ripple, EOS, and/or other currencies. In some implementations, online sales platform 142 may allow a user to make purchases using a virtual currency, such as an in-game or in-platform currency. In some implementations, online sales platform 142 may support a marketplace for selling and/or re-selling tracks and/or stems. In some implementations, a marketplace for tracks and/or stems may use blockchain 144 to track transactions involving tracks and/or stems.

Referring to FIG. 1, in some implementations, server(s) 102, client computing platform(s) 104, and/or external resources 136 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, external resources 136, and/or other components of system 100 may be operatively linked via some other communication media.

A given client computing platform 104 may include one or more processors configured to execute computer program components. The computer program components may be configured to enable an expert or user associated with the given client computing platform 104 to interface with system 100 and/or external resources 136, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 136 may include sources of information outside of system 100, external entities participating with system 100, and/or other resources. In some implementations, some or all of the functionality attributed herein to external resources 136 may be provided by resources included in system 100. In some implementations, external resource 136 may include external electronic storage, e.g., for a set of tracks and/or stems.

Server(s) 102 may include electronic storage 138, one or more processors 140, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 138 may include non-transitory storage media that electronically stores information. The electronic storage media of electronic storage 138 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). In some implementations, the electronic storage media of electronic storage 138 may include one or both of local storage that is provided integrally (i.e., substantially non-removable) with client computing platform(s) 104 and/or removable storage that is removably connectable to client computing platform(s) 104 via, for example, a port (e.g., a USB port, a firewire port, etc.) or a drive (e.g., a disk drive, etc.). Electronic storage 138 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 138 may include one or more virtual storage resources (e.g., cloud storage, a virtual private network, and/or other virtual storage resources). Electronic storage 138 may store software algorithms, information determined by processor(s) 140, information received from server(s) 102, information received from client computing platform(s) 104, and/or other information that enables server(s) 102 to function as described herein.

Processor(s) 140 may be configured to provide information processing capabilities in server(s) 102. As such, processor(s) 140 may include one or more of a digital processor, an analog processor, a digital circuit designed to process information, an analog circuit designed to process information, a state machine, and/or other mechanisms for electronically processing information. Although processor(s) 140 is shown in FIG. 1 as a single entity, this is for illustrative purposes only. In some implementations, processor(s) 140 may include a plurality of processing units. These processing units may be physically located within the same device, or processor(s) 140 may represent processing functionality of a plurality of devices operating in coordination. Processor(s) 140 may be configured to execute components 108, 110, 112, 114, 116, 118, 120, 122, 124, and/or 126, and/or other components. Processor(s) 140 may be configured to execute components 108, 110, 112, 114, 116, 118, 120, 122, 124, and/or 126, and/or other components by software; hardware; firmware; some combination of software, hardware, and/or firmware; and/or other mechanisms for configuring processing capabilities on processor(s) 140. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, and/or 126 are illustrated in FIG. 1 as being implemented within a single processing unit, in implementations in which processor(s) 140 includes multiple processing units, one or more of components 108, 110, 112, 114, 116, 118, 120, 122, 124, and/or 126 may be implemented remotely from the other components. The description of the functionality provided by the different components 108, 110, 112, 114, 116, 118, 120, 122, 124, and/or 126 described in this disclosure is for illustrative purposes, and is not intended to be limiting, as any of components 108, 110, 112, 114, 116, 118, 120, 122, 124, and/or 126 may provide more or less functionality than is described. For example, one or more of components 108, 110, 112, 114, 116, 118, 120, 122, 124, and/or 126 may be eliminated, and some or all of its functionality may be provided by other ones of components 108, 110, 112, 114, 116, 118, 120, 122, 124, and/or 126. As another example, processor(s) 140 may be configured to execute one or more additional components that may perform some or all of the functionality attributed to one of components 108, 110, 112, 114, 116, 118, 120, 122, 124, and/or 126. As another example, in some implementations, some or all of the functionality attributed to one of components 108, 110, 112, 114, 116, 118, 120, 122, 124, and/or 126 may be performed locally, by one or more client computing platform(s) 104.

Figure 2:
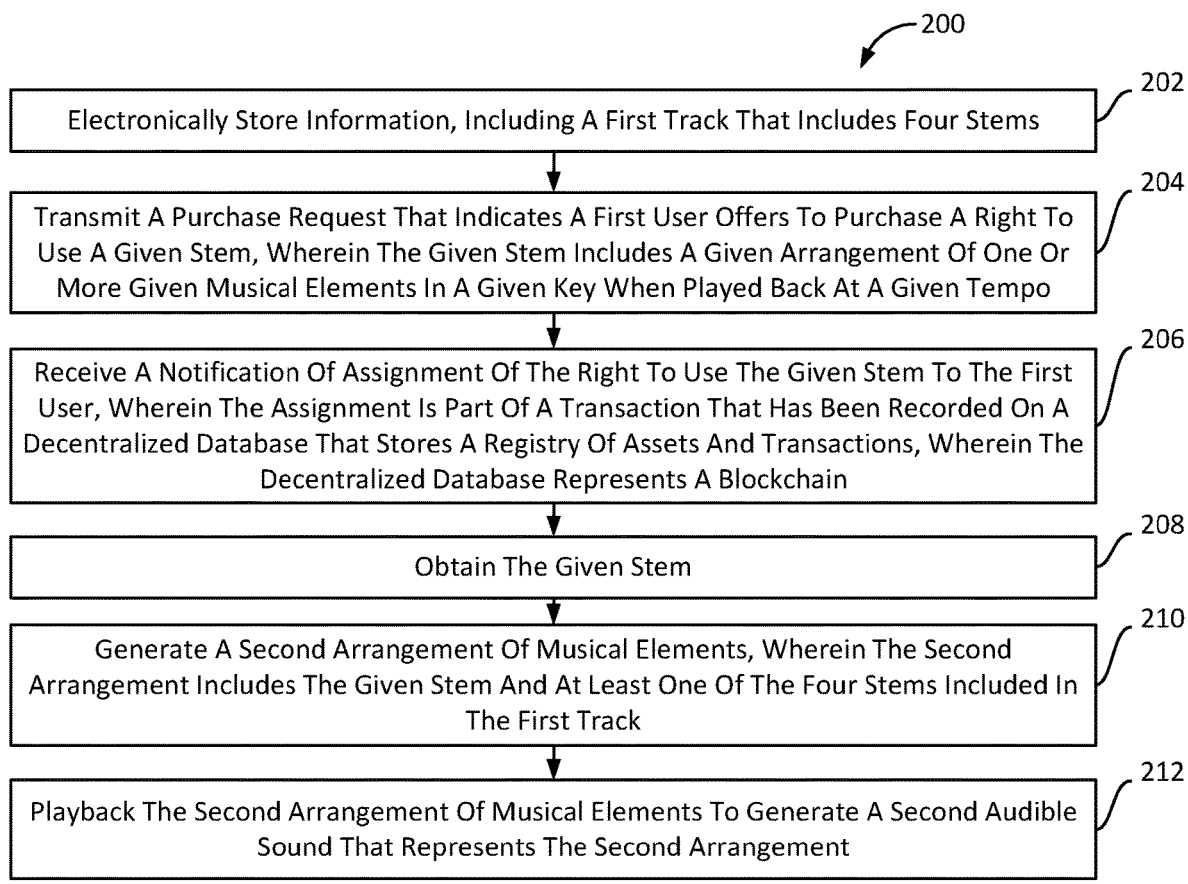
FIG. 2 illustrates a method for facilitating transactions of musical stems between users of an online gaming platform and mixing of the musical stems, in accordance with one or more implementations.

FIG. 2 illustrates a method 200 for facilitating transactions of musical stems between users of an online gaming platform and mixing of the musical stems, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in (or using) one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information is stored in electronic storage. The information includes one or more tracks including a first track. The first track includes a first arrangement of a set of musical elements. The first track can be played back to generate an audible sound that represents the first arrangement. The first track has a first progress length spanning a first number of beats. The first track includes four stems. Individual ones of the four stems have the first progress length. Individual ones of the four stems include a subset of the set of musical elements such that a simultaneous combination of all of the individual ones of the four subsets equals the set of musical elements. At least one of the four stems includes one or more pitched musical elements in a first key when played back at a first tempo. In some embodiments, operation 202 is performed by a storage component the same as or similar to storage component 108 (shown in FIG. 1 and described herein).

At an operation 204, a purchase request is transmitted that indicates the first user offers to purchase a right to use a given stem. The given stem includes a given arrangement of one or more given musical elements in a given key when played back at a given tempo. In some embodiments, operation 204 is performed by a purchase request component the same as or similar to purchase request component 110 (shown in FIG. 1 and described herein).

At an operation 206, a notification is received of assignment of the right to use the given stem to the first user. The assignment is part of a transaction that has been recorded on a decentralized database that stores a registry of assets and transactions. The decentralized database represents a blockchain. In some embodiments, operation 206 is performed by an assignment component the same as or similar to assignment component 112 (shown in FIG. 1 and described herein).

At an operation 208, the given stem is obtained. In some embodiments, operation 208 is performed by a track component the same as or similar to track component 114 (shown in FIG. 1 and described herein).

At an operation 210, a second arrangement of musical elements is generated. The second arrangement includes the given stem and the at least one of the four stems included in the first track. Generation of the second arrangement includes modifying the given stem into a modified stem such that the given arrangement has a modified key when played back at the first tempo. The modified key is within 10 cents of the first key. Generation of the second arrangement includes combining the at least one of the four stems included in the first track and the modified stem such that the second arrangement has the first progress length. In some embodiments, operation 210 is performed by a mix component the same as or similar to mix component 116 (shown in FIG. 1 and described herein).

At an operation 212, the second arrangement of musical elements is played back to generate a second audible sound that represents the second arrangement. In some embodiments, operation 212 is performed by a playback component the same as or similar to playback component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating transactions of musical stems between users of an online gaming platform and mixing of the musical stems, the users including a first user, the system comprising:
    electronic storage configured to electronically store information, wherein the information includes one or more tracks including a first track, wherein the first track includes a first arrangement of a set of musical elements, wherein the first track can be played back to generate an audible sound that represents the first arrangement, wherein the first track has a first progress length spanning a first number of beats, wherein the first track includes four stems, wherein individual ones of the four stems have the first progress length, wherein individual ones of the four stems include a subset of the set of musical elements such that a simultaneous combination of all of the individual ones of the four subsets equals the set of musical elements, wherein at least one of the four stems includes one or more pitched musical elements in a first key when played back at a first tempo; and
    one or more hardware processors configured by machine-readable instructions to:
        transmit a purchase request that indicates the first user offers to purchase a right to use a given stem, wherein the given stem includes a given arrangement of one or more given musical elements in a given key when played back at a given tempo;
        receive a notification of assignment of the right to use the given stem to the first user, wherein the assignment is part of a transaction that has been recorded on a decentralized database that stores a registry of assets and transactions, wherein the decentralized database represents a blockchain;
        obtain the given stem;
        generate a second arrangement of musical elements, wherein the second arrangement includes the given stem and the at least one of the four stems included in the first track, wherein generation of the second arrangement includes:
            (i) modifying the given stem into a modified stem such that the given arrangement has a modified key when played back at the first tempo, wherein the modified key is within 10 cents of the first key;
            (ii) combining the at least one of the four stems included in the first track and the modified stem such that the second arrangement has the first progress length; and
        playback the second arrangement of musical elements to generate a second audible sound that represents the second arrangement.

2. The system of claim 1, wherein the one or more tracks further include a second track and a third track that each include four stems, wherein the second track has a second key when played back at a second tempo, wherein the third track has a third key when played back at a third tempo, wherein the one or more hardware processors are further configured by machine-readable instructions to:
    generate additional arrangements of musical elements, wherein individual ones of the additional arrangements include four stems selected from stems included in the first track, the second track, the third track, and the given stem, wherein generation of the additional arrangements includes modifying at least three of the four selected stems.

3. The system of claim 2, wherein a first ratio of a first frequency of the first key divided by the first tempo in beats per minute (BPM) is the same as a second ratio of a second frequency of the second key divided by the second tempo.

4. The system of claim 3, wherein the first frequency is 523.25 Hz and the first tempo is 120 BPM.

5. The system of claim 4, wherein the first ratio and the second ratio are within 0.1% of 4.36.

6. The system of claim 1, wherein the generation of the second arrangement further includes modifying the at least one of the four stems included in the first track, wherein playback of the second arrangement is done at a tempo between the first tempo and the given tempo.

7. The system of claim 1, wherein the one or more hardware processors are further configured by machine-readable instructions to:
    generate and present a user interface to the first user;
    receive user input form the first user through the user interface;
    wherein the generation of the second arrangement is based at least in part on the received user input.

8. The system of claim 1, wherein the four stems included in the first track include a drum stem, a bass stem, a harmony stem, and a melody stem.

9. The system of claim 1, wherein the one or more tracks use a common time signature.

10. The system of claim 1, wherein the one or more hardware processors are further configured by machine-readable instructions to:
    manage user accounts for the users of the online gaming platform, wherein individual ones of the user accounts are associated with individual ones of the users, wherein the individual ones of the user accounts include individual user inventories of virtual items that are usable within the online gaming platform by the individual ones of the users, wherein, subsequent to the first user purchasing the given stem, a first inventory of the first user includes the given stem.

11. A method for facilitating transactions of musical stems between users of an online gaming platform and mixing of the musical stems, the users including a first user, the method comprising:
electronically storing information, wherein the information includes one or more tracks including a first track, wherein the first track includes a first arrangement of a set of musical elements, wherein the first track can be played back to generate an audible sound that represents the first arrangement, wherein the first track has a first progress length spanning a first number of beats, wherein the first track includes four stems, wherein individual ones of the four stems have the first progress length, wherein individual ones of the four stems include a subset of the set of musical elements such that a simultaneous combination of all of the individual ones of the four subsets equals the set of musical elements, wherein at least one of the four stems includes one or more pitched musical elements in a first key when played back at a first tempo; and
transmitting a purchase request that indicates the first user offers to purchase a right to use a given stem, wherein the given stem includes a given arrangement of one or more given musical elements in a given key when played back at a given tempo;
receiving a notification of assignment of the right to use the given stem to the first user, wherein the assignment is part of a transaction that has been recorded on a decentralized database that stores a registry of assets and transactions, wherein the decentralized database represents a blockchain;
obtaining the given stem;
generating a second arrangement of musical elements, wherein the second arrangement includes the given stem and the at least one of the four stems included in the first track, wherein generation of the second arrangement includes:
(i) modifying the given stem into a modified stem such that the given arrangement has a modified key when played back at the first tempo, wherein the modified key is within 10 cents of the first key;
(ii) combining the at least one of the four stems included in the first track and the modified stem such that the second arrangement has the first progress length; and
playing back the second arrangement of musical elements to generate a second audible sound that represents the second arrangement.

12. The method of claim 11, wherein the one or more tracks further include a second track and a third track that each include four stems, wherein the second track has a second key when played back at a second tempo, wherein the third track has a third key when played back at a third tempo, the method further comprising:
generating additional arrangements of musical elements, wherein individual ones of the additional arrangements include four stems selected from stems included in the first track, the second track, the third track, and the given stem, wherein generation of the additional arrangements includes modifying at least three of the four selected stems.

13. The method of claim 11, wherein a first ratio of a first frequency of the first key divided by the first tempo in beats per minute (BPM) is the same as a second ratio of a second frequency of the second key divided by the second tempo.

14. The method of claim 13, wherein the first frequency is 440 Hz and the first tempo is 100.90 BPM.

15. The method of claim 14, wherein the first ratio and the second ratio are within 0.1% of 4.36.

16. The method of claim 11, wherein the generation of the second arrangement further includes modifying the at least one of the four stems included in the first track, wherein playback of the second arrangement is done at a tempo between the first tempo and the given tempo.

17. The method of claim 11, further comprising:
generating and presenting a user interface to the first user;
receiving user input form the first user through the user interface;
wherein the generation of the second arrangement is based at least in part on the received user input.

18. The method of claim 11, wherein the four stems included in the first track include a drum stem, a bass stem, a harmony stem, and a melody stem.

19. The method of claim 11, further comprising:
managing user accounts for the users of the online gaming platform, wherein individual ones of the user accounts are associated with individual ones of the users, wherein the individual ones of the user accounts include individual user inventories of virtual items that are usable within the online gaming platform by the individual ones of the users, wherein, subsequent to the first user purchasing the given stem, a first inventory of the first user includes the given stem.

20. A system configured for facilitating transactions of musical tracks between users of an online gaming platform and mixing of stems included in the musical tracks, the users including a first user, the system comprising:
electronic storage configured to electronically store information, wherein the information includes a set of tracks including a first track, wherein the first track includes a first arrangement of a set of musical elements, wherein the first track can be played back to generate an audible sound that represents the first arrangement, wherein the first track has a first progress length spanning a first number of beats, wherein the first track includes four stems, wherein individual ones of the four stems have the first progress length, wherein individual ones of the four stems include a subset of the set of musical elements such that a simultaneous combination of all of the individual ones of the four subsets equals the set of musical elements, wherein at least one of the four stems includes one or more pitched musical elements in a first key when played back at a first tempo; and
one or more hardware processors configured by machine-readable instructions to:
transmit a purchase request that indicates the first user offers to purchase a right to use a given track that includes four stems, wherein the given track includes a given arrangement of one or more given musical elements in a given key when played back at a given tempo;
receive a notification of assignment of the right to use the given track to the first user, wherein the assignment is part of a transaction that has been recorded on a decentralized database that stores a registry of assets and transactions, wherein the decentralized database represents a blockchain;
obtain the given track;
generate a set of arrangements of musical elements, wherein the set of arrangements includes a given arrangement, wherein the given arrangement includes at least one stem from the given track and at least one stem selected from the set of tracks, wherein generation of an individual arrangement in the set of arrangements includes:
  (i) automatically selecting a melody stem, wherein the melody stem provides a master key and a master tempo;
  (ii) automatically selecting up to three additional stems from the set of tracks and the given track, such that the up to three additional stems have up to one harmony stem, up to one bass stem, and up to one drum stem;
  (iii) modifying the up to three additional stems into modified stems such that the individual arrangement is within 10 cents of the master key; and
  (iv) combining the melody stem and the up to three additional stems; and
playback, to the first user, the set of arrangements including the individual arrangement to generate audible sound that represents the set of arrangements, wherein the generation of the set of arrangements and the playback of the set of arrangements occurs automatically without requiring user input from the first user.

\* \* \* \* \*